(No Model.)
I. T. HOPPER.
WATER FILTER.
No. 551,381. Patented Dec. 17, 1895.
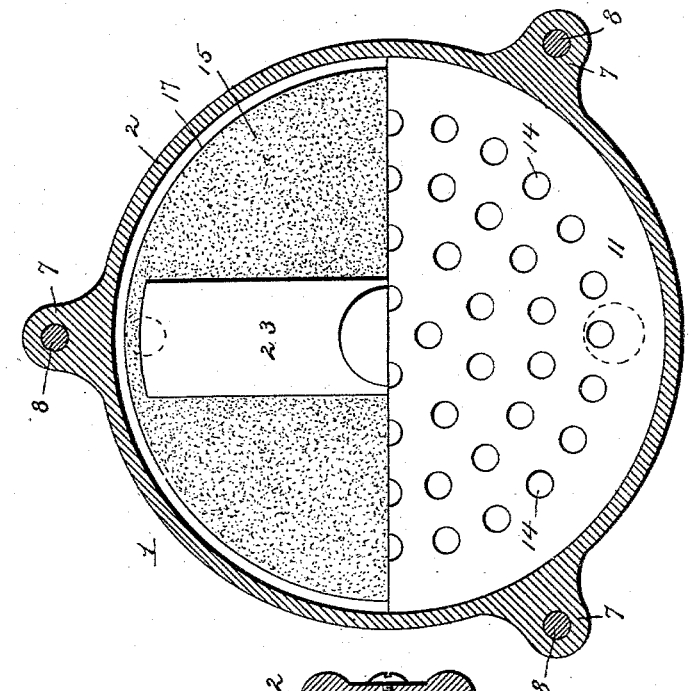
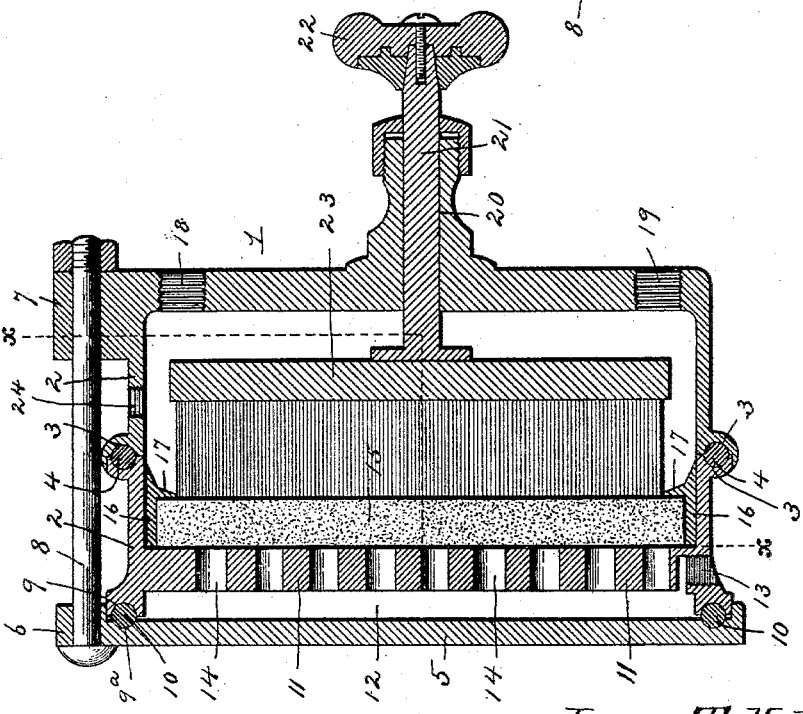
Witnesses
Harry L. Amer.
D. P. Holhauser.
Inventor
Isaac T. Hopper.
By his Attorneys.
C. A. Snow & Co.

UNITED STATES PATENT OFFICE.

ISAAC T. HOPPER, OF ST. JOSEPH, MISSOURI.

WATER-FILTER.

SPECIFICATION forming part of Letters Patent No. 551,381, dated December 17, 1895.

Application filed September 29, 1894. Serial No. 524,517. (No model.)

*To all whom it may concern:*

Be it known that I, ISAAC T. HOPPER, a citizen of the United States, residing at St. Joseph, in the county of Buchanan and State of Missouri, have invented a new and useful Water-Filter, of which the following is a specification.

This invention relates to water-filters of that class commonly known as "pressure" water-filters, that filter water introduced therein under pressure from a line of piping or other source of supply.

To this end the main and primary object of the present invention is to construct a new and useful water-filter having simple and efficient means for thoroughly filtering the water, while at the same time being easily cleaned without being taken apart, and also providing a construction of filter the several parts of which can be readily taken apart and assembled.

With these and other objects in view, which will readily appear as the nature of the invention is better understood, the same consists in the novel construction, combination and arrangement of parts hereinafter more fully described, illustrated and claimed.

In the drawings, Figure 1 is a central longitudinal sectional view of a water-filter constructed in accordance with this invention. Fig. 2 is a sectional view on the line $x\,x$ of Fig. 1.

Referring to the accompanying drawings, 1 designates a sectional filter box or casing that may be constructed in a cylindrical, square, or other suitable shape, and the same comprises the separate box or casing sections 2 2, that are provided at their meeting edges with the semicircular registering gasket-grooves 3, that receive a rubber gasket 4, to provide a water-tight joint between the separate sections of the box or casing. The said filter box or casing 1 is open at one side and is removably inclosed at such open side by the detachable cap-plate 5, that is provided at intervals with offstanding perforated bolt-lugs 6, which are adapted to align with similar bolt-lugs 7 on one of the sections of the filter box or casing, and the said aligned bolt-lugs removably receive the tie-bolts 8, that serve to detachably clamp the filter-box sections together. The box or casing section 2, onto which the cap-plate 5 is clamped, is further provided in its outer edge with a semicircular gasket-groove 9, that registers with a similar groove $9^a$, formed on the inner side of the plate 5, to receive the gasket 10, which also provides a water-tight joint between the filter-box and the cap-plate inclosing the open side thereof.

The sectional filter box or casing 1 is provided therein with an integral combined strainer and rest-plate 11, that is disposed adjacent to the cap-plate 5 to form at one side of the same a filtered-water space 12, with which communicates an outlet-opening 13, formed in the wall of the filter box or casing and adapted to have a faucet or other suitable connection therewith to provide for the carrying off of the filtered water. The combined strainer and rest-plate 11 is provided throughout its entire area with a series of perforations 14, to allow the filtered water to pass into the space 12, and the said plate 11 also forms a rest or support for the filter-stone 15, that is adapted to rest flat against one side of the same.

The filter-stone 15 may be made of any suitable filtering material and in a shape conforming to the shape of the box or casing 1 and of a width slightly less than the width of said box or casing. A flanged rubber or other suitable packing-ring 16 is interposed between the periphery of the stone 15 and the inner sides of the box or casing 1, to provide not only for retaining the stone properly in position, but also for effecting a water-tight joint therebetween and the inner sides of the box or casing. The flange 17 of the ring 16 overlaps one side edge of the stone 15, to insure a perfectly water-tight joint.

The water is admitted into the box or casing 1 through the inlet-opening 18, formed in the closed side of the box or casing, and is filtered through the stone 15 into the space 12. The unfiltered water may be drawn out from the space at one side of the stone 15 through the opening 19, also formed in the closed side of the box or casing, and into which is adapted to be fitted a suitable faucet for drawing off the unfiltered water. 24 designates an opening for the connection of an ordinary vacuum-valve.

The closed side of the filter box or casing 1 is provided with an offstanding stuffing-box 20, that accommodates for movement therein the turning stem 21, carrying upon its outer end a handle or hand-wheel 22 and upon its inner end within the box or casing a revolving cleaning-brush 23, that is adapted to be rotated against one side of the filter-stone 15. By moving the cleaning-brush 23 inward against the stone 15 and rotating the brush the same will clean the said stone, and when not in use the said brush can be carried away from the stone and allowed to remain out of contact therewith while the filter is in operation. It will therefore be seen that the filter-stone may be readily cleaned without taking apart the filter.

Changes in the form, proportion, and the minor details of construction may be resorted to without departing from the principle or sacrificing any of the advantages of this invention.

Having described the invention, what is claimed, and desired to be secured by Letters Patent, is—

In a water filter, a sectional filter box or casing provided with an open side and with an integral perforate plate disposed adjacent to the open side, an imperforate cap plate detachably secured over the open side of the box or casing and arranged parallel with the perforate plate to inclose therewith an intervening filtered water space, a filter stone arranged flat against the side of the perforate plate opposite the filtered water space, and a packing ring tightly interposed in the space between the periphery of the stone and the inner sides of the box or casing, said packing ring being provided at one edge with an inturned flange overlapping one side edge of the stone, substantially as set forth.

In testimony that I claim the foregoing as my own I have hereto affixed my signature in the presence of two witnesses.

ISAAC T. HOPPER.

Witnesses:
T. G. BREWSTER,
W. W. BROWN.